United States Patent Office 3,396,043
Patented Aug. 6, 1968

3,396,043
PROCESS FOR PRODUCING CELLULATED SILICA
John Alexander Winterburn, Tynemouth, North Shields, Northumberland, England, assignor to The Thermal Syndicate Limited, Northumberland, England, a British company
No Drawing. Filed Sept. 28, 1964, Ser. No. 399,912
Claims priority, application Great Britain, Sept. 27, 1963, 38,139/63
5 Claims. (Cl. 106—40)

ABSTRACT OF THE DISCLOSURE

Cellulated silica is produced by heating a homogeneous mixture of finely divided silica with from 0.1% to 5% by weight of finely divided metal selected from the group consisting of aluminum and silicon to a temperature between 1500° C., and 1800° C.

---

This invention relates to an improved method of producing cellulated silica, and also to cellulated silica produced by the method.

Proposals have been made for producing cellulated silica by a process which involves the addition of graphite or silicon carbide to silica in the form of sand or crushed quartz. The mixture of carbonaneous material and particles of silica is sintered in a first stage of the process and then comminuted and subsequently fused in a second stage of the process. The cellulation probably occurs according to the formula:

$$C + SiO_2 \rightarrow SiO + CO$$

or $$SiC + 2SiO_2 \rightarrow 3SiO + CO$$

The basic reaction believed to lie behind cellulating by this known process, thus results in the formation of gaseous oxides of carbon within the mass of fused silica, which oxides cause the fused mass to foam up so that when it solidifies it is cellulated. The need for a two-stage process, is thought to lie in the comparatively low reactivity between silica and the carbonaceous material, due to the fact that neither graphite nor silicon carbide is molten at the cellulating temperature so that intimate contact between the particles of silica and the carbonaceous material in the mixture does not occur. Secondary additives have been suggested, to reduce the viscosity of the silica and promote better contact with the carbonaceous cellulating agent. Typical concentrations of carbonaceous material for the known process, would be several percent by weight (measured as carbon in the mixture) of the weight of silica.

It is one object of the present invention to provide an improved method of producing cellulated silica which permits the production of cellulated silica in a single operation.

It is a further object of the present invention to produce an improved cellulated silica having properties of refractoriness and resistance to divitrification which, at the usual working temperatures of vitreous silica (i.e. less than 1000° C.), are little different from those of substantially pure uncellulated vitreous silica.

A still further object of the present invention is to provide an improved method of adding a cellulating agent to a finely divided silica prior to forming a cellulated silica.

According to the present invention a method of producing cellulated silica comprises heating a homogeneous mixture of finely divided silica with from 0.1% to 5% w./w. of finely divided aluminium and/or silicon metal to a temperature between 1500° C. and 1800° C. to cause the mixture to cohere into a plastic mass and cellulate.

Prefeably the amount of aluminium or silicon metal employed is less than 2% w./w. of the silica, and in the case of aluminium less than 1% w./w.

The foaming action caused by the method of the invention is believed to be due to vaporisation of silicon monoxide at the fusion temperature of the silica.

In the case of aluminium we believe that the cellulating effect occurs according to:

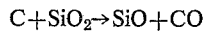

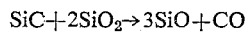

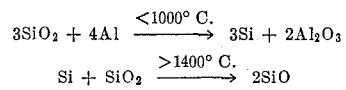

The silicon formed in the first stage occurs as a coating on the silica particles and is thus in intimate contact with them. Silicon melts at 1420° C. thus whether the silicon is added as metal powder or formed by reaction of aluminium with silica, intimate contact occurs between the cellulating agent and the silica below the cellulating temperature.

The particles of silica can be present in the mixture as silica sand or as crushed quartz.

I prefer to use aluminium powder and less than ½% by weight of the powdered metal gives satisfactory results.

Owing to the high reactivity of aluminium, the chemical reaction between silica and aluminium resulting in the production of silicon monoxide proceeds speedily and since the aluminium readily "wets" the particles of silica, cellulated silica can be produced by the method of the invention in a single stage process.

Neither aluminium nor silicon is easily oxidised, thus less care is required to ensure that heating is carried out in an absolutely reducing or neutral atmosphere than is the case with graphite. Some care about the furnace atmosphere is still required, however, especially when dealing with finely divided aluminium, otherwise the effectiveness of the additive may be reduced.

Although it has been proposed previously to make secondary additions of aluminium oxides and aluminium silicates along with carbonaceous cellulating agents, the fact that aluminium metal itself in the absence of other cellulating agents can act as a most effective cellulating agent has not previously been suggested. This is confirmed by the fact that aluminium metal, aluminium oxides and aluminium silicates have been suggested as equivalents when employed as secondary additives. Of these three types only aluminium metal itself has been found to be satisfactory as a prime cellulating agent.

Silicon powder mixes easily with finely divided silica just by tumbling together but aluminium powder does not. Preferably the addition of aluminium is made by rolling the silica with pieces of aluminium, such as balls or rods. In this way the aluminium metal tends to coat the silica and the mixture does not easily segregate afterwards. The actual amount of aluminium in the mixture can easily be determined by reacting a known amount of the mixture with dilute hydrochloric or sulphuric acid and measuring the volume of hydrogen liberated. In this way the weight of aluminium in the mixture can be calculated.

The following examples will illustrate the invention in greater detail:

EXAMPLE 1

Silica sand having a silica content of 99.7% was tumbled with aluminium rods until the mixture was a uniform grey colour and contained ½% aluminium. The aluminium rods were removed and replaced with flint pebbles. Milling was commenced and continued until at least 90% of the sand and aluminium mixture passed through a 180 mesh sieve. The mixture freed from the pebbles was then placed in graphite trays coated with boron nitride and heated in an electric furnace to 1700° C. for 4 mins. After rapid cooling the product had a density of 0.2 gm./cc.

EXAMPLE 2

99.5 parts of sand with a silica content of 99.7% was mixed with 0.5 parts of powdered aluminium, the sizes of the aluminium particles being between 120 mesh and 240 mesh. The mixture of sand and aluminium powder was then heated in a furnace with a neutral atmosphere to a temperature of 1550° C. and maintained at that temperature for 20 minutes. On cooling the cellulated silica produced was found to have a density of 0.8 gm./cc.

EXAMPLE 3

99 parts of sand with a silica content of 99.7% was mixed with 1 part of silicon and then milled with flint pebbles until the mixture passed through a 240 sieve. The mixture was heated in an electric furnace with a neutral atmosphere to 1700° C. for 5 minutes. After rapid cooling the cellulated silica produced was found to have a density of 0.3 gm./cc.

It is well known that impurities have a deleterious effect on the refractoriness and resistance to devitrification of vitreous silica. In the case of silicon there is no effective added impurity, but in the case of aluminium, aluminium oxide or silicate is produced as a by-product. The effect of this impurity has been investigated. With 1% addition of aluminium, devitrification of the product at 1400° C. is greatly accelerated but this is normally considered to be outside the working range of vitreous silica. At 1300° C. and below there is little difference between the rate of devitrification of substantially pure vitreous silica and that containing 1% aluminium as impurity. The same is substantially true for the effect on the refractoriness at working temperatures of 1000° C. or less.

I claim:

1. A method of producing cellulated silica which comprises heating a homogeneous mixture of finely divided silica in a non-oxidizing atmosphere with from 0.1% to 5% by weight of finely divided metal selected from the group consisting of aluminum and silicon to a temperature between 1500° C. and 1800° C.

2. A method of producing cellulated silica which comprises heating a homogeneous mixture of finely divided silica sand with from 0.1% to less than 1% by weight of finely divided aluminum in a non-oxidizing atmosphere to a temperature between 1500° C. and 1800° C.

3. The method as clamed in claim 2, in which the homogeneous mixture is obtained by tumbling the silica sand with pieces of aluminum.

4. A method of producing cellulated silica which comprises heating a homogeneous mixture of finely divided silica with between 0.1% and 5% by weight of a finely divided mixture of aluminum and silicon in a non-oxidizing atmosphere to a temperature between 1500° C. and 1800° C.

5. A method of producing cellulated silica which comprises heating in a non-oxidizing atmosphere a homogeneous mixture of finely divided silica wth from 0.1% to 5% by weight of at least one finely divided metal selected from the group consisting of aluminum and silicon to a temperature sufficiently high to cause cellulation of said mixture.

References Cited

UNITED STATES PATENTS 2,741,822   4/1956   Udy _____ 106—65

JAMES E. POER, *Primary Examiner.*